(12) United States Patent
Boyd et al.

(10) Patent No.: US 7,549,003 B2
(45) Date of Patent: *Jun. 16, 2009

(54) CREATION AND MANAGEMENT OF DESTINATION ID ROUTING STRUCTURES IN MULTI-HOST PCI TOPOLOGIES

(75) Inventors: William T Boyd, Poughkeepsie, NY (US); Douglas M Freimuth, New York, NY (US); William G Holland, Cary, NC (US); Steven W Hunter, Raleigh, NC (US); Renato J Recio, Austin, TX (US); Steven M Thurber, Austin, TX (US); Madeline Vega, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/032,768

(22) Filed: Feb. 18, 2008

(65) Prior Publication Data

US 2008/0140839 A1 Jun. 12, 2008

Related U.S. Application Data

(63) Continuation of application No. 11/260,610, filed on Oct. 27, 2005, now Pat. No. 7,363,404.

(51) Int. Cl.
*G06F 13/00* (2006.01)
*G06F 13/40* (2006.01)
(52) U.S. Cl. .................. 710/104; 710/110; 710/316
(58) Field of Classification Search .................. 710/104, 710/110, 316
See application file for complete search history.

(56) References Cited

U.S. PATENT DOCUMENTS 5,257,353 A 10/1993 Blanck et al.
5,367,695 A 11/1994 Narad et al.

(Continued)

FOREIGN PATENT DOCUMENTS

WO 2006089914 A1 8/2006

OTHER PUBLICATIONS

U.S. Appl. No. 11/567,411, filed Dec. 6, 2006, Boyd et al.

(Continued)

*Primary Examiner*—Paul R Myers
*Assistant Examiner*—Ryan M Stiglic
(74) *Attorney, Agent, or Firm*—Yee & Associates, P.C.; Matthew W. Baca (57) ABSTRACT

System and method for managing routing of data in a distributed computing system, such as a distributed computing system that uses PCI Express protocol to communicate over an I/O fabric. A physical tree that is indicative of a physical configuration of the distributed computing system is determined, and a virtual tree is created from the physical tree. The virtual tree is then modified to change an association between at least one source device and at least one target device in the virtual tree. A validation mechanism validates the changed association between the at least one source device and the at least one target device to enable routing of data from the at least one source device to the at least one target device.

11 Claims, 9 Drawing Sheets

U.S. PATENT DOCUMENTS

| | | |
|---|---|---|
| 5,392,328 A | 2/1995 | Schmidt et al. |
| 5,960,213 A | 9/1999 | Wilson |
| 5,968,189 A | 10/1999 | Desnoyers et al. |
| 6,025,319 A | 2/2000 | Surutzidis et al. |
| 6,061,753 A | 5/2000 | Ericson |
| 6,662,251 B2 | 12/2003 | Brock et al. |
| 6,769,021 B1 | 7/2004 | Bradley |
| 6,775,750 B2 | 8/2004 | Krueger |
| 6,907,510 B2 | 6/2005 | Bennett et al. |
| 7,036,122 B2 | 4/2006 | Bennett et al. |
| 7,096,305 B2 | 8/2006 | Moll |
| 7,134,052 B2 | 11/2006 | Bailey et al. |
| 7,174,413 B2 | 2/2007 | Pettey et al. |
| 7,188,209 B2 | 3/2007 | Pettey et al. |
| 7,194,538 B1 | 3/2007 | Rabe et al. |
| 7,478,178 B2 * | 1/2009 | Torudbakken et al. ......... 710/31 |
| 2002/0188701 A1 | 12/2002 | Brown et al. |
| 2003/0018860 A1 | 1/2003 | Krueger |
| 2003/0221030 A1 | 11/2003 | Pontius et al. |
| 2004/0039986 A1 | 2/2004 | Solomon et al. |
| 2004/0123014 A1 | 6/2004 | Schaefer et al. |
| 2004/0172494 A1 | 9/2004 | Pettey et al. |
| 2004/0210754 A1 | 10/2004 | Barron et al. |
| 2004/0230709 A1 | 11/2004 | Moll |
| 2004/0230735 A1 | 11/2004 | Moll |
| 2005/0025119 A1 | 2/2005 | Pettey et al. |
| 2005/0044301 A1 | 2/2005 | Vasilevsky et al. |
| 2005/0102437 A1 | 5/2005 | Pettey et al. |
| 2005/0102682 A1 | 5/2005 | Shah et al. |
| 2005/0147117 A1 | 7/2005 | Pettey et al. |
| 2005/0188116 A1 | 8/2005 | Brown et al. |
| 2005/0228531 A1 | 10/2005 | Genovker et al. |
| 2005/0270988 A1 | 12/2005 | DeHaemer |
| 2006/0168361 A1 | 7/2006 | Brown et al. |
| 2006/0174094 A1 | 8/2006 | Lloyd et al. |
| 2006/0179195 A1 | 8/2006 | Sharma et al. |
| 2006/0179238 A1 | 8/2006 | Griswell, Jr. et al. |
| 2006/0179239 A1 | 8/2006 | Fluhr et al. |
| 2006/0179265 A1 | 8/2006 | Flood et al. |
| 2006/0179266 A1 | 8/2006 | Flood et al. |
| 2006/0184711 A1 | 8/2006 | Pettey et al. |
| 2006/0184767 A1 | 8/2006 | Le et al. |
| 2006/0184768 A1 | 8/2006 | Bishop et al. |
| 2006/0184769 A1 | 8/2006 | Floyd et al. |
| 2006/0184770 A1 | 8/2006 | Bishop et al. |
| 2006/0184946 A1 | 8/2006 | Bishop et al. |
| 2006/0195617 A1 | 8/2006 | Arndt et al. |
| 2006/0195619 A1 | 8/2006 | Arndt et al. |
| 2006/0195634 A1 | 8/2006 | Arndt et al. |
| 2006/0195642 A1 | 8/2006 | Arndt et al. |
| 2006/0195644 A1 | 8/2006 | Arndt et al. |
| 2006/0195663 A1 | 8/2006 | Arndt et al. |
| 2006/0195673 A1 | 8/2006 | Arndt et al. |
| 2006/0195848 A1 | 8/2006 | Arndt et al. |
| 2006/0206655 A1 | 9/2006 | Chappell et al. |
| 2006/0206936 A1 | 9/2006 | Liang et al. |
| 2006/0209863 A1 | 9/2006 | Arndt et al. |
| 2006/0212608 A1 | 9/2006 | Arndt et al. |
| 2006/0212620 A1 | 9/2006 | Arndt et al. |
| 2006/0212870 A1 | 9/2006 | Arndt et al. |
| 2006/0224790 A1 | 10/2006 | Arndt et al. |
| 2006/0230181 A1 | 10/2006 | Riley |
| 2006/0230217 A1 | 10/2006 | Moll |
| 2006/0239287 A1 | 10/2006 | Johnsen et al. |
| 2006/0242330 A1 | 10/2006 | Torudbakken et al. |
| 2006/0242332 A1 | 10/2006 | Johnsen et al. |
| 2006/0242333 A1 | 10/2006 | Johnsen et al. |
| 2006/0242352 A1 | 10/2006 | Torudbakken et al. |
| 2006/0242354 A1 | 10/2006 | Johnsen et al. |
| 2006/0271820 A1 | 11/2006 | Mack et al. |
| 2007/0019637 A1 | 1/2007 | Boyd et al. |
| 2007/0027952 A1 | 2/2007 | Boyd et al. |
| 2007/0097871 A1 | 5/2007 | Boyd et al. |
| 2007/0097949 A1 | 5/2007 | Boyd et al. |
| 2007/0097950 A1 | 5/2007 | Boyd et al. |
| 2007/0101016 A1 | 5/2007 | Boyd et al. |
| 2007/0136458 A1 | 6/2007 | Boyd et al. |
| 2007/0165596 A1 | 7/2007 | Boyd et al. |
| 2007/0174733 A1 | 7/2007 | Boyd et al. |
| 2007/0183393 A1 | 8/2007 | Boyd et al. |
| 2007/0186025 A1 | 8/2007 | Boyd et al. |
| 2007/0208898 A1 * | 9/2007 | Pettey et al. ................ 710/312 |
| 2008/0192648 A1 * | 8/2008 | Galles ........................ 370/254 |

OTHER PUBLICATIONS

U.S. Appl. No. 11/567,425, filed Dec. 6, 2006, Boyd et al.

* cited by examiner

CREATION AND MANAGEMENT OF DESTINATION ID ROUTING STRUCTURES IN MULTI-HOST PCI TOPOLOGIES

This application is a continuation of application number 11/260,610, filed Oct. 27, 2005, status allowed.

BACKGROUND OF THE INVENTION

1. Field of the Invention

The present invention relates generally to the data processing field, and more particularly, to communication between a host computer and an input/output (I/O) adapter through an I/O fabric, wherein the I/O fabric is attached to more than one root node and wherein each root can potentially share the I/O adapter with the other roots. Especially the invention pertains to a method for creating and managing the structures needed for routing PCI transaction packets between multiple hosts and adapters, through a PCI switched-fabric bus when using a destination identifier.

2. Description of the Related Art

PCI (Peripheral Component Interconnect) Express is widely used in computer systems to interconnect host units to adapters or other components, by means of a PCI switched-fabric bus or the like. However, currently, PCI Express does not permit sharing of PCI adapters in topologies where there are Multiple Hosts with Multiple Shared PCI busses. Support for this type of function can be very valuable on blade clusters and on other clustered servers. Currently, PCI Express and secondary network (e.g. FC, IB, Enet) adapters are integrated into blades and server systems, and cannot be shared between clustered blades or even between multiple roots within a clustered system. For blade environments, it can be very costly to dedicate these network adapters to each blade. For example, the current cost of a 10 Gigabit Ethernet adapter is in the $6000 range. The inability to share these expensive adapters between blades has contributed to the slow adoption rate of some new network technologies (e.g. 10 Gigabit Ethernet). In addition, there is a constraint in space available in blades for PCI adapters. A PCI network that is able to support attachment of multiple hosts and to share Virtual PCI IOAs among the multiple hosts would overcome these deficiencies in current systems.

In order to allow virtualization of PCI secondary adapters in this environment, a mechanism is needed to route MMIO (Memory-Mapped Input/Output) packets from a host to a target adapter, and to route DMA (Direct Memory Access) packets from an adapter to the appropriate host in such a way that the System Image's memory and data is prevented from being accessed by unauthorized applications in other System Images, and from other adapters in the same PCI tree. It is also desirable that such a mechanism be implemented with minimum changes to current PCI hardware.

Commonly assigned, copending U.S. patent application entitled ROUTING MECHANISM IN PCI MULTI-HOST TOPOLOGIES USING DESTINATION ID FIELD, Ser. No. 11/260,621, filed on Oct. 27, 2005 the disclosure of which is hereby incorporated by reference, describes a routing mechanism for a distributed computing system, such as a system that uses PCI-Express protocol to communicate over an I/O fabric. The routing mechanism includes a destination identifier to identify a physical or virtual end point. When a physical or virtual end point or host receives a transaction packet it compares a list of source identifiers with destination identifiers using a Destination ID Validation Table (DIDVT) to determine if a source identifier included in the transaction packet is associated with the destination identifier. Only if the transaction packet has a valid association, is it routed to a target device.

Modifications are frequently made to a distributed computing system that affects the routing of data through the system. For example, IOAs in the system may be transferred from one host to another, or hosts and/or IOAs may be added to or removed from the system. In order to ensure that the routing mechanism described in the above-identified patent application functions as intended in such an environment, a mechanism is needed to manage the routing of data by the routing mechanism to reflect such modifications to the system.

It would, accordingly, be desirable to provide a method and system for managing the routing of data by a routing mechanism in a distributed computing system, for example, a distributed computing system that uses PCI Express protocol to communicate over an I/O fabric, to reflect modifications made to the distributed computing system.

SUMMARY OF THE INVENTION

The present invention provides a method and system for managing the routing of data in a distributed computing system, such as a distributed computing system that uses PCI Express protocol to communicate over an I/O fabric. A physical tree that is indicative of a physical configuration of the distributed computing system is determined, and a virtual tree is created from the physical tree. The virtual tree is then modified to change an association between at least one source device and at least one target device in the virtual tree. A validation mechanism validates the changed association between the at least one source device and the at least one target device to enable routing of data from the at least one source device to the at least one target device.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention applies to any general or special purpose computing system where multiple root complexes (RCs) are sharing a pool of IOAs through a common I/O fabric. More specifically, the exemplary embodiment described herein details the mechanism when the I/O fabric uses the PCI Express protocol.

Figure 1:
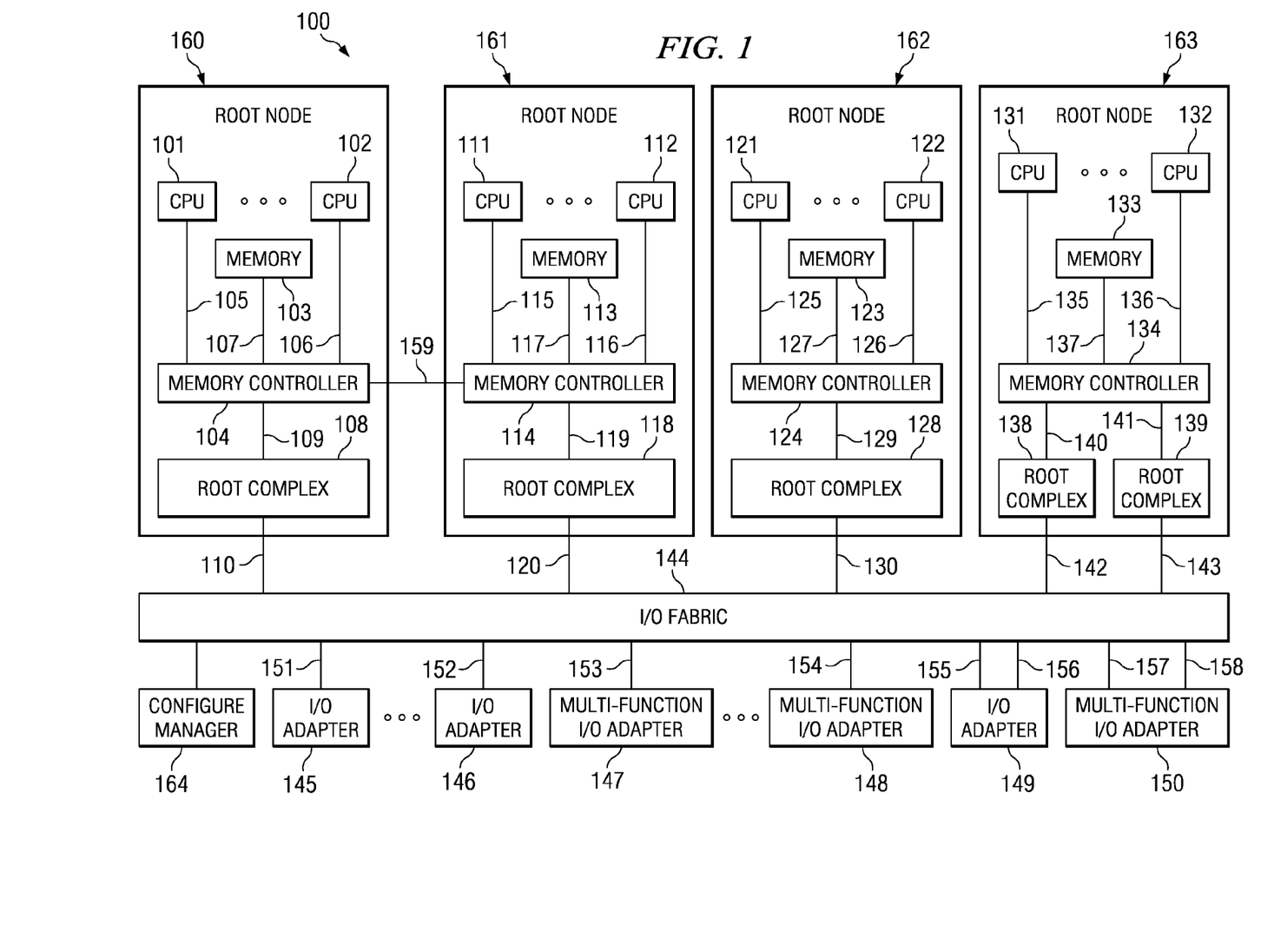
FIG. 1 is a block diagram that illustrates a distributed computing system according to an exemplary embodiment of the present invention.

With reference now to the figures and in particular with reference to FIG. 1, a block diagram of a distributed computing system is depicted according to an exemplary embodiment of the present invention. The distributed computing system is generally designated by reference number 100 and takes the form of two or more Root Complexes (RCs), five RCs 108, 118, 128, 138 and 139 being provided in the exemplary embodiment illustrated in FIG. 1. RCs 108, 118, 128, 138 and 139 are attached to an I/O fabric 144 through I/O links 110, 120, 130, 142, and 143, respectively; and are connected to memory controllers 104, 114, 124 and 134 of root nodes (RNs) 160, 161, 162 and 163, through links 109, 119, 129, 140 and 141, respectively. I/O fabric 144 is attached to IOAs 145, 146, 147, 148, 149 and 150 through links 151, 152, 153, 154, 155, 156, 157 and 158. The IOAs may be single function IOAs, such as IOAs 145, 146 and 149; or multiple function IOAs, such as IOAs 147, 148 and 150. Further, the IOAs may be connected to I/O fabric 144 via single links as in IOAs 145, 146, 147 and 148; or with multiple links for redundancy as in 149 and 150.

RCs 108, 118, 128, 138 and 139 are each part of one of Root Nodes (RNs) 160, 161, 162 and 163. There may be one RC per RN as in the case of RNs 160, 161 and 162, or more than one RC per RN as in the case of RN 163. In addition to the RCs, each RN includes one or more Central Processing Units (CPUs) 101-102, 111-112, 121-122 and 131-132; memory 103, 113, 123 and 133; and memory controller 104, 114, 124 and 134 which connects the CPUs, memory, and I/O RCs, and performs such functions as handling the coherency traffic for the memory.

RNs may be connected together at their memory controllers, as illustrated by connection 159 connecting RNs 160 and 161, to form one coherency domain which may act as a single Symmetric Multi-Processing (SMP) system, or may be independent nodes with separate coherency domains as in RNs 162 and 163.

Configuration manager 164 may be attached separately to I/O fabric 144 as shown in FIG. 1, or may be part of one of RNs 160-163. Configuration manager 164 configures the shared resources of the I/O fabric and assigns resources to the RNs.

Distributed computing system 100 may be implemented using various commercially available computer systems. For example, distributed computing system 100 may be implemented using an IBM eServer iSeries Model 840 system available from International Business Machines Corporation, Armonk, N.Y. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
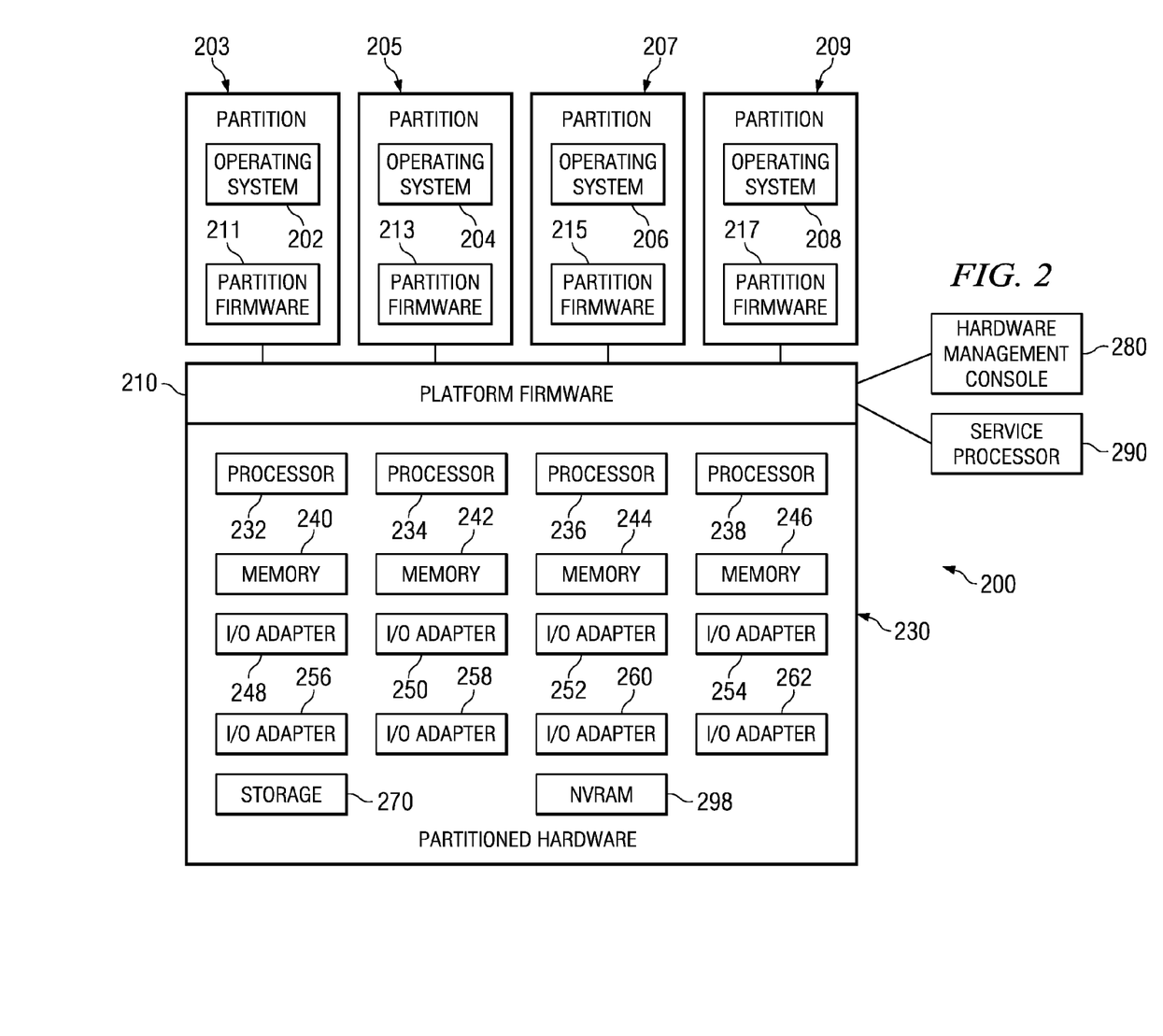
FIG. 2 is a block diagram that illustrates an exemplary logical partitioned platform in which the present invention may be implemented.

With reference now to FIG. 2, a block diagram of an exemplary logical partitioned platform is depicted in which the present invention may be implemented. The platform is generally designated by reference number 200, and hardware in logical partitioned platform 200 may be implemented as, for example, distributed computing system 100 in FIG. 1.

Logical partitioned platform 200 includes partitioned hardware 230; operating systems 202, 204, 206 and 208; and partition management firmware (platform firmware) 210. Operating systems 202, 204, 206 and 208 are located in partitions 203, 205, 207 and 209, respectively; and may be multiple copies of a single operating system or multiple heterogeneous operating systems simultaneously run on logical partitioned platform 200. These operating systems may be implemented using OS/400, which is designed to interface with partition management firmware 210. OS/400 is intended only as one example of an implementing operating system, and it should be understood that other types of operating systems, such as AIX and Linux, may also be used, depending on the particular implementation.

An example of partition management software that may be used to implement partition management firmware 210 is Hypervisor software available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Partitions 203, 205, 207 and 209 also include partition firmware 211, 213, 215 and 217, respectively. Partition firmware 211, 213, 215 and 217 may be implemented using initial boot strap code, IEEE-1275 Standard Open Firmware, and runtime abstraction software (RTAS), which is available from International Business Machines Corporation. When partitions 203, 205, 207 and 209 are instantiated, a copy of boot strap code is loaded onto partitions 203, 205, 207 and 209 by platform firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes a plurality of processors 232, 234, 236 and 238; a plurality of system memory units 240, 242, 244 and 246; a plurality of IOAs 248, 250, 252, 254, 256, 258, 260 and 262; storage unit 270 and Non-Volatile Random Access Memory (NVRAM) storage unit 298. Each of the processors 232-238, memory units 240-246, storage 270 and NVRAM storage 298, and IOAs 248-262, or parts thereof, may be assigned to one of multiple partitions within logical partitioned platform 200, each of which corresponds to one of operating systems 202, 204, 206 and 208.

Partition management firmware 210 performs a number of functions and services for partitions 203, 205, 207 and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206 and 208 by virtualizing the hardware resources of logical partitioned platform 200.

Service processor 290 may be used to provide various services, such as processing platform errors in the partitions. These services may also include acting as a service agent to report errors back to a vendor, such as International Business Machines Corporation.

Operations of the different partitions may be controlled through hardware management console 280. Hardware management console 280 is a separate distributed computing system from which a system administrator may perform various functions including reallocation of resources to different partitions.

In a logical partitioned (LPAR) environment, it is not permissible for resources or programs in one partition to affect operations in another partition. Furthermore, to be useful, the assignment of resources needs to be fine-grained. For example, it is often not acceptable to assign all IOAs under a particular PCI Host Bridge (PHB) to the same partition, as that will restrict configurability of the system, including the ability to dynamically move resources between partitions.

Accordingly, some functionality is needed in the bridges and switches that connect IOAs to the I/O bus so as to be able to assign resources, such as individual IOAs or parts of IOAs to separate partitions; and, at the same time, prevent the assigned resources from affecting other partitions such as by obtaining access to resources of the other partitions.

Figure 3:
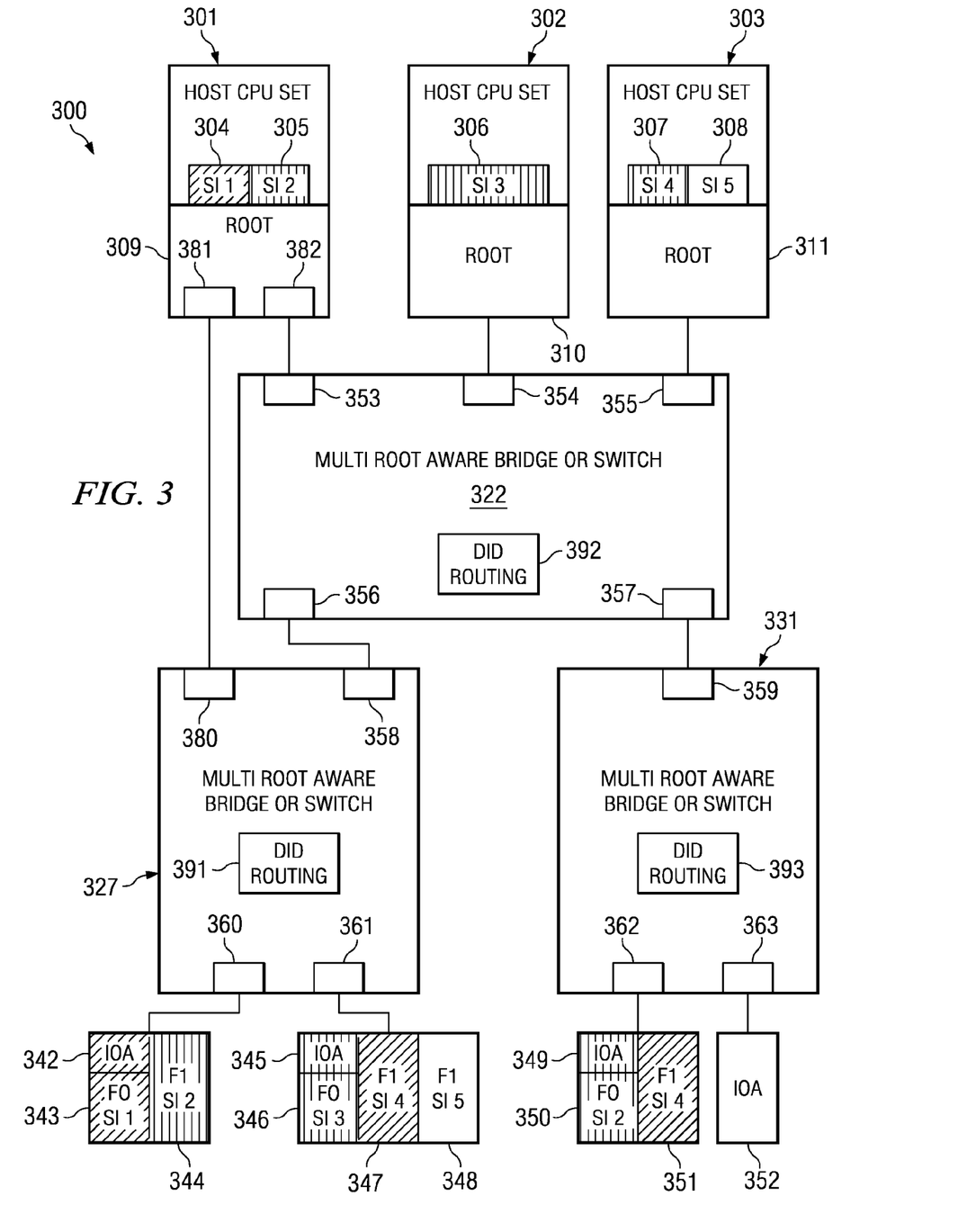
FIG. 3 is a diagram that illustrates a multi-root computing system interconnected through multiple bridges or switches according to an exemplary embodiment of the present invention.

With reference now to FIG. 3, a diagram that illustrates a multi-root computing system interconnected through multiple bridges or switches is depicted according to an exemplary embodiment of the present invention. The system is generally designated by reference number 300. The mechanism presented in this description includes a new field, referred to herein as a Destination ID (DID) field. This DID field is part of a PCI Express packet. The DID number (DID#) field could be one of the following: a physical DID field, a virtual DID (e.g., a Virtual Entity ID), or another kind of label devised to identify the different devices connected through a PCI I/O fabric.

Furthermore, FIG. 3 illustrates the concept of a PCI fabric that supports multiple roots through the use of multiple bridges or switches. The configuration consists of a plurality of host CPU sets 301, 302 and 303, each containing a single or a plurality of system images (SIs). In the configuration illustrated in FIG. 3, host CPU set 301 contains two SIs 304 and 305, host CPU set 302 contains SI 306 and host CPU 303 contains SIs 307 and 308. These systems interface to the I/O fabric through their respective RCs 309, 310 and 311. Each RC can have one port, such as RC 310 or 311, or a plurality of ports, such as RC 309 which has two ports 381 and 382. Host CPU sets 301, 302 and 303 along with their corresponding RCs will be referred to hereinafter as root nodes 301, 302 and 303.

Each root node is connected to a root port of a multi root aware bridge or switch, such as multi root aware bridges or switches 322 and 327. It is to be understood that the term "switch" when used herein by itself, may include both switches and bridges. The term "bridge" as used herein generally pertains to a device for connecting two segments of a network that use the same protocol. As shown in FIG. 3, root nodes 301, 302 and 303 are connected to root ports 353, 354 and 355, respectively, of multi root aware bridge or switch 322; and root node 301 is further connected to multi root aware bridge or switch 327 at root port 380. A multi root aware bridge or switch, by way of this invention, provides the configuration mechanisms necessary to discover and configure a multi root PCI fabric.

The ports of a bridge or switch, such as multi root aware bridge or switch 322, 327 or 331, can be used as upstream ports, downstream ports, or both upstream and downstream ports, where the definition of upstream and downstream is as described in PCI Express Specifications. In FIG. 3, ports 353, 354, 355, 359, and 380 are upstream ports, and ports 357, 360, 361, 362, and 363 are downstream ports. However, when using the DID based routing mechanism described herein, the direction is not necessarily relevant, as the hardware does not care which direction the transaction is heading since it routes the transaction using the unique DID number associated with each destination.

The ports configured as downstream ports are used to attach to adapters or to the upstream port of another bridge or switch. In FIG. 3, multi root aware bridge or switch 327 uses downstream port 360 to attach IO Adapter 342, which has two virtual IO adapters or virtual IO resources 343 and 344. Similarly, multi root aware bridge or switch 327 uses downstream port 361 to attach IO Adapter 345, which has three virtual IO adapters or virtual IO resources 346, 347 and 348. Multi root aware bridge or switch 322 uses downstream port 357 to attach to port 359 of multi root aware bridge or switch 331. Multi root aware bridge or switch 331 uses downstream ports 362 and 363 to attach IOA 349 and IOA 352, respectively.

The ports configured as upstream ports are used to attach a RC. In FIG. 3, multi root aware switch 327 uses upstream port 380 to attach to port 381 of root 309. Similarly, multi root aware switch 322 uses upstream port 353, 354 and 355 to attach to port 382 of root 309, root 310's single port and root 311's single port.

In the exemplary embodiment illustrated in FIG. 3, IOA 342 is a virtualized IOA with its function 0 (F0) 343 assigned and accessible to SI1 304, and its function 1 (F1) 344 assigned and accessible to SI2 305. In a similar manner, IOA 345 is a virtualized IOA with its function 0 (F0) 346 assigned and accessible to SI3 306, its function 1 (F1) 347 assigned and accessible to SI4 307, and its function 3 (F3) assigned to SI5 308. IOA 349 is a virtualized IOA with its F0 350 assigned and accessible to SI2 305, and its F1 351 assigned and accessible to SI4 307. IOA 352 is a single function IOA assigned and accessible to SI5 308.

FIG. 3 also illustrates where the mechanisms for DID based routing would reside according to an exemplary embodiment of the present invention; however, it should be understood that other components within the configuration could also store whole or parts of DID routing tables without departing from the essence of the invention. In FIG. 3, DID routing mechanisms 391, 392, and 393 are shown to be located in bridges or switches 327, 322 and 331, respectively. These mechanisms consist of tables and associations that will be further described hereinafter.

I/O transactions from System Images to Adapters and vice versa are routed using the Destination ID field as follows: a bridge or switch uses DID to look-up egress bridge or switch port (through association of the DID to bridge or switch port in the DIDRT; and transfers a packet (unchanged) through the egress bridge or switch port. Each end-to-end association can have its own PCI Bus Memory Address Space, because the bridges or switches do not use the address for routing.

Figure 4:
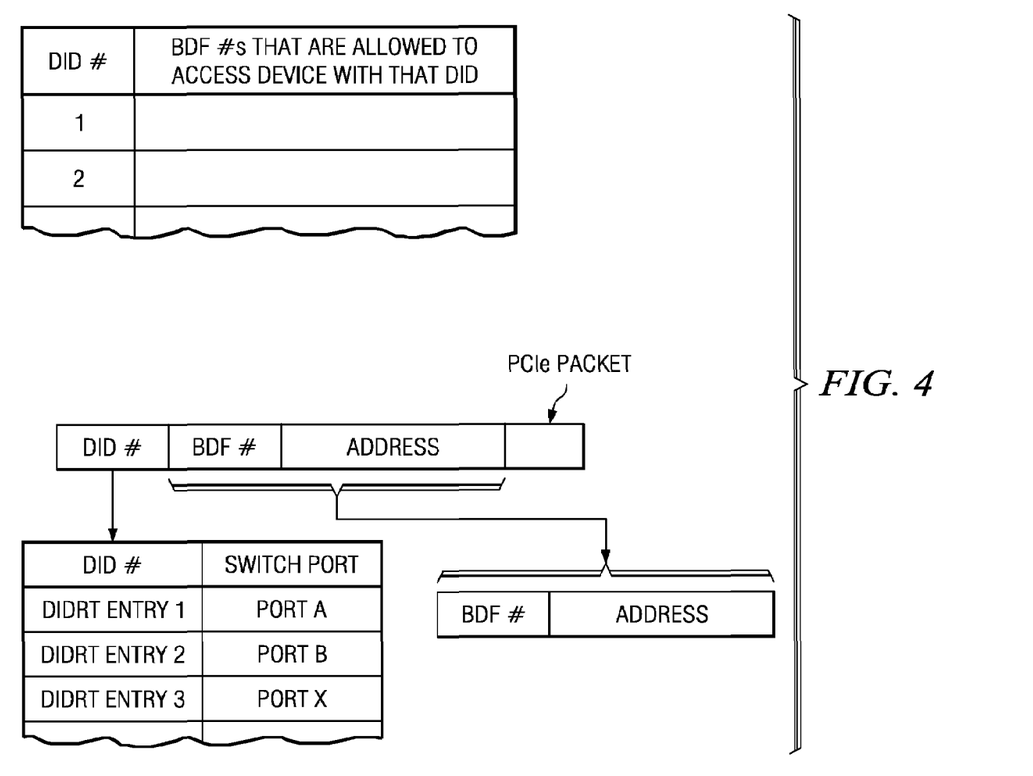
FIG. 4 is a diagram that illustrates a Destination ID Validation Table and a Destination ID Routing Table and their association with a PCI Express packet according to an exemplary embodiment of the present invention.

FIG. 4 is a diagram that schematically illustrates a Destination ID Validation Table and a Destination ID Routing Table and their association with a PCI Express packet according to an exemplary embodiment of the present invention. As shown, the present invention defines an additional field, the DID#, which defines which device to access. The DID# is assigned by the configuration manager, which is a trusted program, at fabric configuration time, and is remembered by the hardware and automatically appended by the hardware on each I/O transaction. The PCI Express I/O transaction packet also has an address that identifies which PCI address to access in the targeted device. The DID# is used in conjunction with DID Routing Tables (DIDRTs) in bridges, switches and/or other components to send PCI Express packages to the correct destination. The DIDRT has a number of entries that associate each DID# in the distributed computing system with the bridge or switch port that the packet should be sent to, in order for the packet to reach the correct destination. A DID Validation Table is also shown in FIG. 4. This table is used to list which BDF# (source) can access a specific device associated with a DID (destination). The BDF# is a field that identifies the source of a transaction by the Bus, Device and Function values. The table provides a way of ensuring that only virtual entities (adapters, IOAs) that are allowed to access a specific system image can do so (and vice versa).

Figure 5:
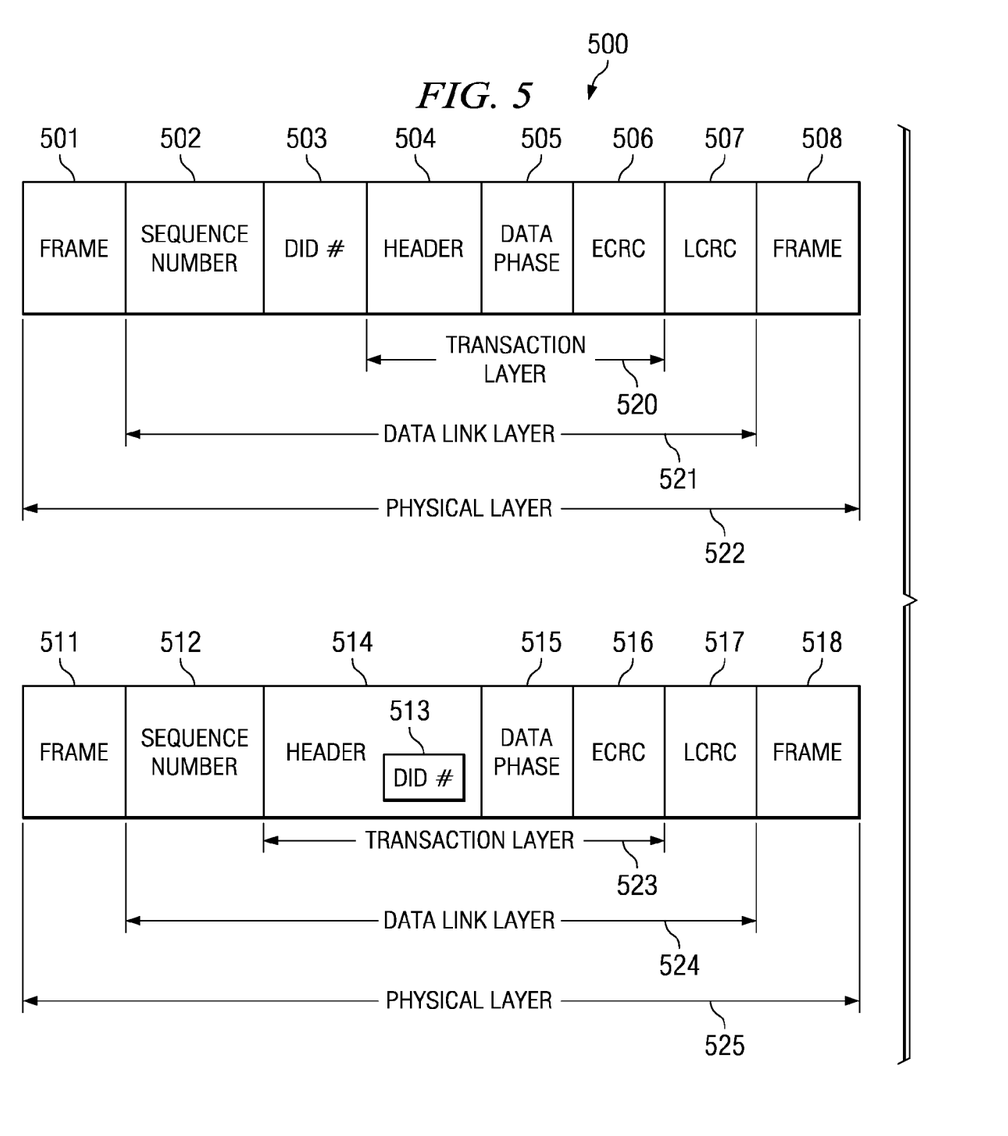
FIG. 5 is a diagram that illustrates a PCI Express transaction, showing two different places where the DID number field could be implemented according to exemplary embodiments of the present invention.

FIG. 5 is a diagram that schematically illustrates two examples of a PCI Express transaction according to an exemplary embodiment of the present invention. The PCI Express transaction is generally designated by reference number 500 and includes transaction layer 520 or 523, data link layer 521 or 524, and physical layer 522 or 525. The fields that are contained in each layer are shown delimited by the arrows in FIG. 5.

The transaction is framed by framing field 501 and 508, or 511 and 518. The sequence number field 502 or 512 is part of the data link layer and keeps transactions in order. The header field 504 or 514 is part of the transaction layer and contains information about the transaction. The data phase 505 or 515 contains the data, when there is any, in the transaction. The end to end CRC (ECRC) 506 or 516 provides an end to end check on the transaction data and header. Link CRC (LCRC) 507 provides a link level data integrity check.

The DID number field can be inserted outside the transaction layer or inside the transaction layer. FIG. 5 illustrates DID number field 503 inserted outside transaction layer 520, and DID number field 513 inserted inside transaction layer 523. In the former case, the DID number field will not be covered by the ECRC data integrity check. In the latter case, the DID number will be covered by the ECRC.

Figure 6:
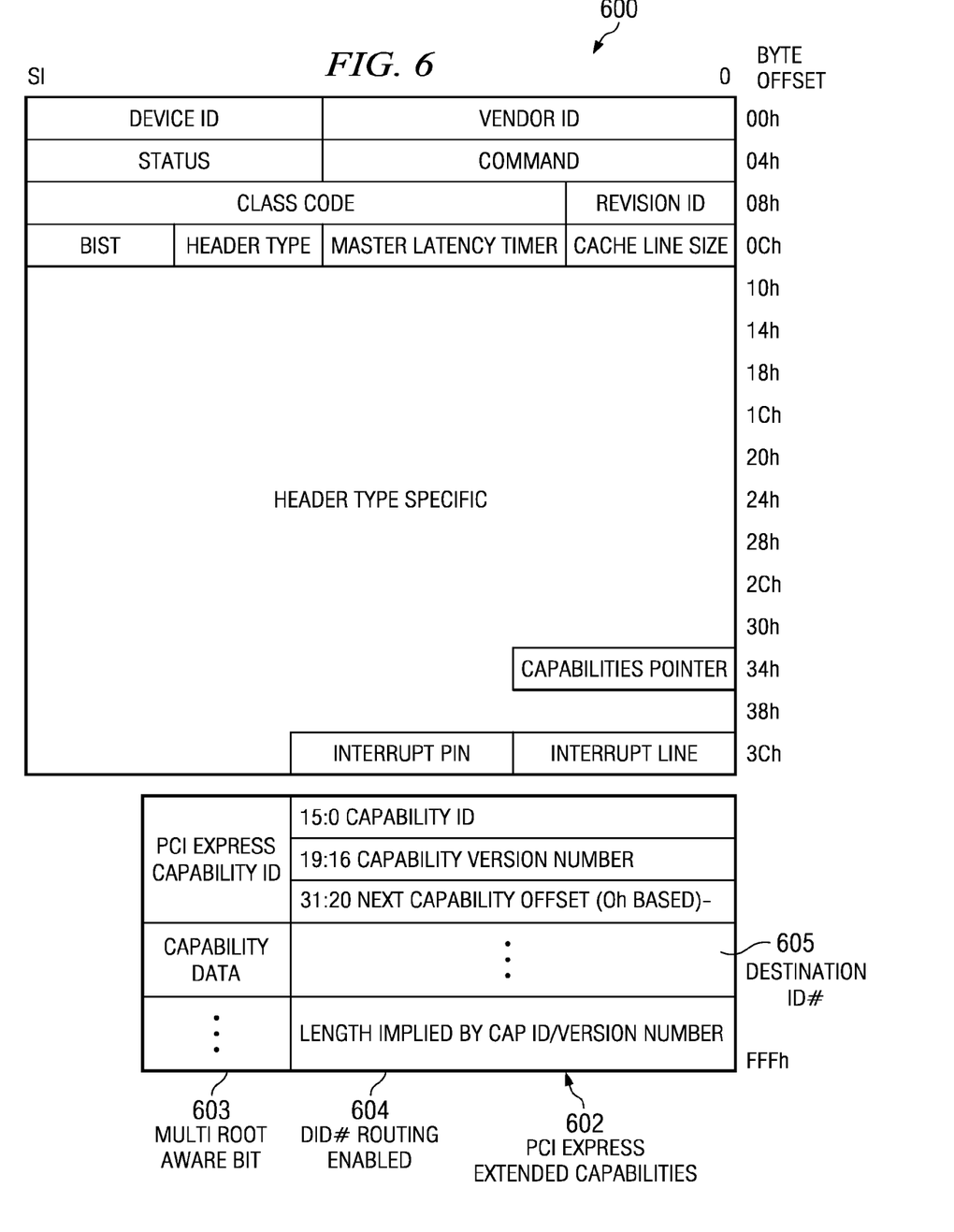
FIG. 6 illustrates a PCI configuration header according to an exemplary embodiment of the present invention.

FIG. 6 illustrates a PCI configuration header according to an exemplary embodiment of the present invention. The PCI configuration header is generally designated by reference number 600, and PCI Express starts its extended capabilities 602 at a fixed address in PCI configuration header 600. These can be used to determine if the PCI component is a multi-root aware PCI component and if the device supports DID-based routing. If the PCI Express extended capabilities 602 has multi-root aware bit set 603 and DID based routing supported bit 604 then the DID# for the device can be stored in 605 in the PCI Express Extended Capabilities area. It should be understood, however, that the present invention is not limited to the herein described scenario where the PCI extended capabilities are used to define the DID. Any other field could be redefined or reserved fields used for the Destination ID field implementation on other specifications for PCI.

The present invention is directed to a method and system for managing the routing of data in a distributed computing system, for example, a distributed computing system that uses PCI Express protocol to communicate over an I/O fabric, to reflect modifications made to the distributed computing system. In particular, the present invention provides a mechanism for managing the Destination ID field included in the above-described data routing mechanism to ensure that the routing mechanism properly reflects modifications made in the distributed computing system that affects the routing of data through the system such as transferring IOAs from one host to another, or adding or removing hosts and/or IOAs from the system.

Figure 7:
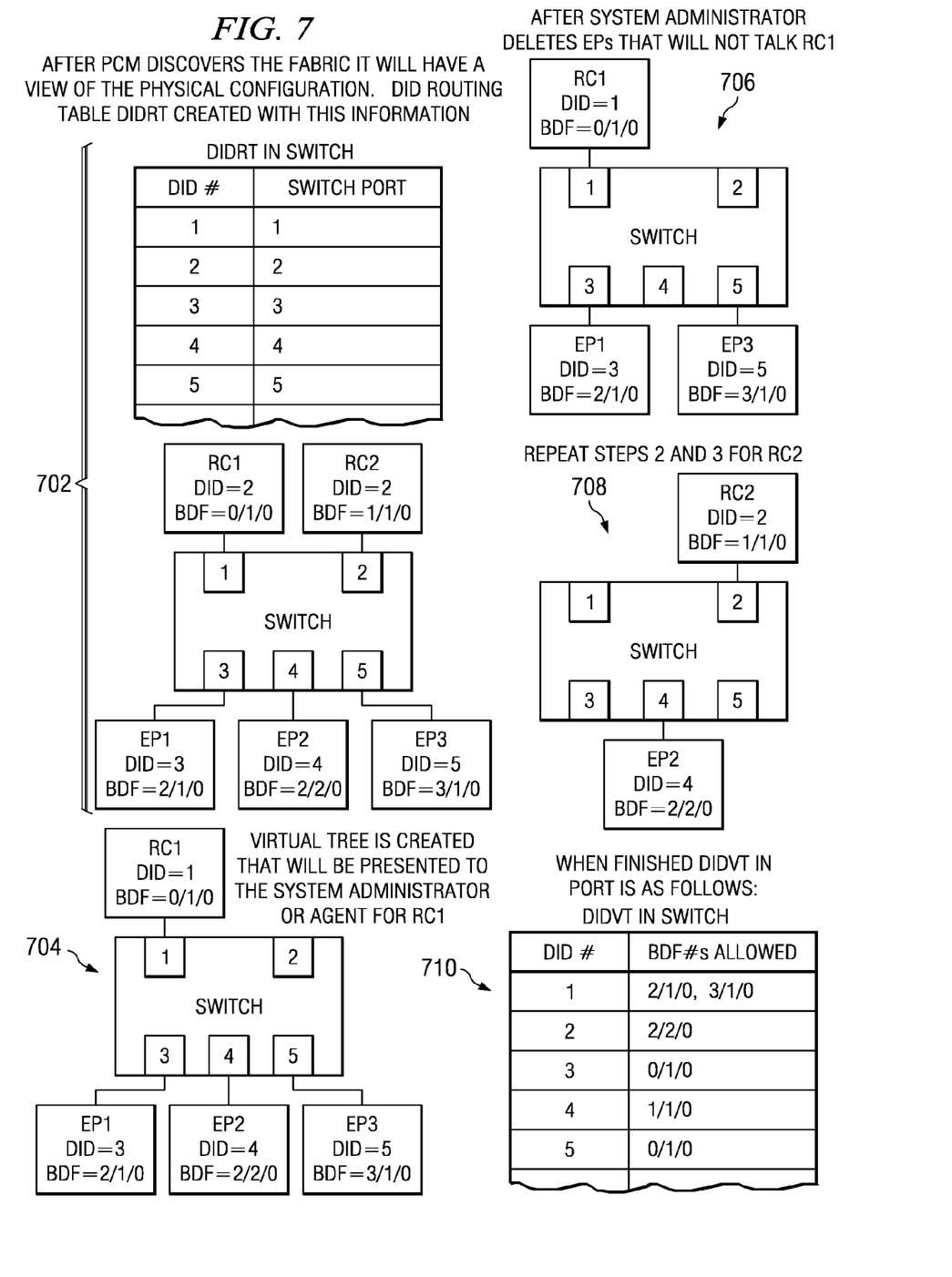
FIG. 7 presents diagrams that schematically illustrate a system for managing the routing of data in a distributed computing system according to an exemplary embodiment of the present invention.

FIG. 7 presents diagrams that schematically illustrate a system for managing the routing of data in a distributed computing system according to an exemplary embodiment of the present invention. In particular, FIG. 7 illustrates a specific example of how a routing mechanism in the distributed computing system is altered to reflect a change in an association between a root complex and an IOA in the distributed computing system.

As shown in diagram 702, the PCI Configuration Manager (PCM) first creates a DID Routing Table (DIDRT) representing a tree indicative of the current physical configuration of the distributed computing system. The PCM creates this table by discovering the current configuration of the I/O fabric so that it will have a full view of the physical configuration of the fabric, and then creates the DIDRT from this information. The manner in which this may be accomplished is described in detail in commonly assigned, copending U.S. patent application entitled METHOD FOR CONFIRMING IDENTITY OF A MASTER NODE SELECTED TO CONTROL I/O FABRIC CONFIGURATION IN A MULTI-HOST ENVIRONMENT, Ser. No. 11/260,624, filed on Oct. 27, 2005, the disclosure of which is hereby incorporated by reference. In the physical tree shown in diagram 702, it is assumed that End Point 1 (EP 1) and EP 3 be assigned to RC 1, and that EP 2 be assigned to RC 2. The PCM then creates a virtual tree from the physical tree to be presented to an administrator or agent for RC 1 as shown in diagram 704. It will be noted that this configuration is the same as the physical configuration shown in diagram 702, but is now virtual.

The system administrator or agent for RC 1 then modifies the virtual tree by deleting EP 2 so that it cannot communicate with RC 1 as shown in diagram 706. The PCM then creates a new DID Validation Table (DIDVT) to reflect the modification of the virtual tree.

The procedure illustrated in diagrams 704 and 706 is then repeated for RC 2. In particular, the PCM presents a virtual tree to the system administrator or agent for RC 2, and the system administrator or agent modifies the virtual tree by deleting EP 1 and EP 3 so that they cannot communicate with RC 2 as shown in diagram 708.

When the above-described process has been completed for all RCs in the physical tree, the DIDVT in the switch will be as shown in diagram 710 wherein the DIDVT validates RC 1 to communicate with EP 1 and EP 3 and vice versa, and validates RC 2 to communicate with EP 2 and vice versa. It should be understood that although only two RCs and three EPs are included in the physical tree in FIG. 7, this is intended to be exemplary only, as the tree may include any desired number of RCs and EPs.

Figure 8:
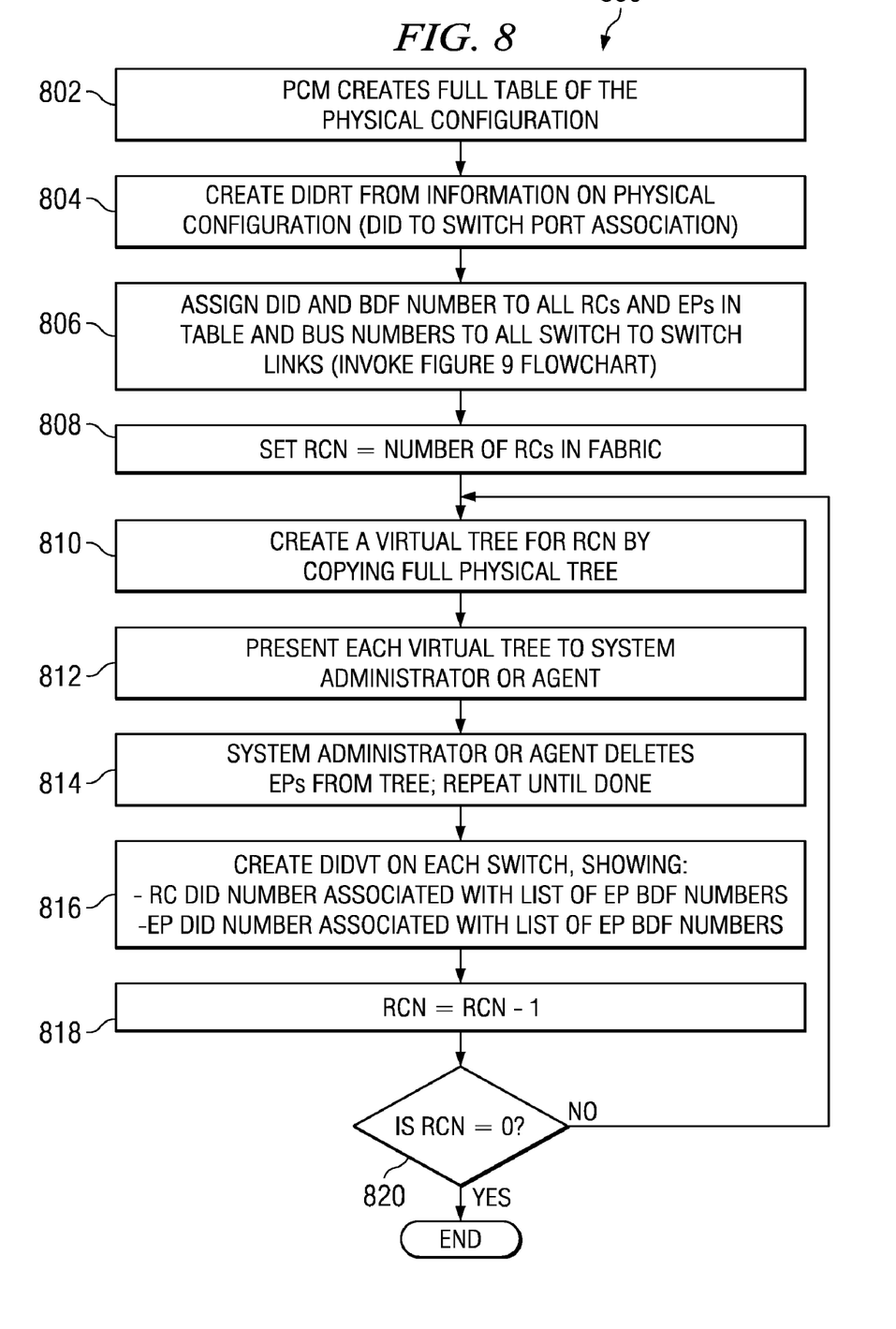
FIG. 8 is a flowchart that illustrates a method for managing the routing of data in a distributed computing system according to an exemplary embodiment of the present invention.

FIG. 8 is a flowchart that illustrates a method for managing the routing of data in a distributed computing system according to an exemplary embodiment of the present invention. The method is generally designated by reference number 800, and begins by the PCM creating a full table of the physical configuration of the I/O fabric utilizing the mechanism described in the above-referenced commonly assigned, copending U.S. patent application entitled METHOD FOR CONFIRMING IDENTITY OF A MASTER NODE SELECTED TO CONTROL I/O FABRIC CONFIGURATION IN A MULTI-HOST ENVIRONMENT Ser. No. 11/260,624, filed on Oct. 27, 2005 (Step 802). The PCM then creates a DIDRT from the information on physical configuration to make "DID-to-switch port" associations (Step 804). A DID and BDF# is then assigned to all RCs and EPs in the DIDRT and Bus#s are assigned to all switch to switch links (Step 806).

Figure 9:
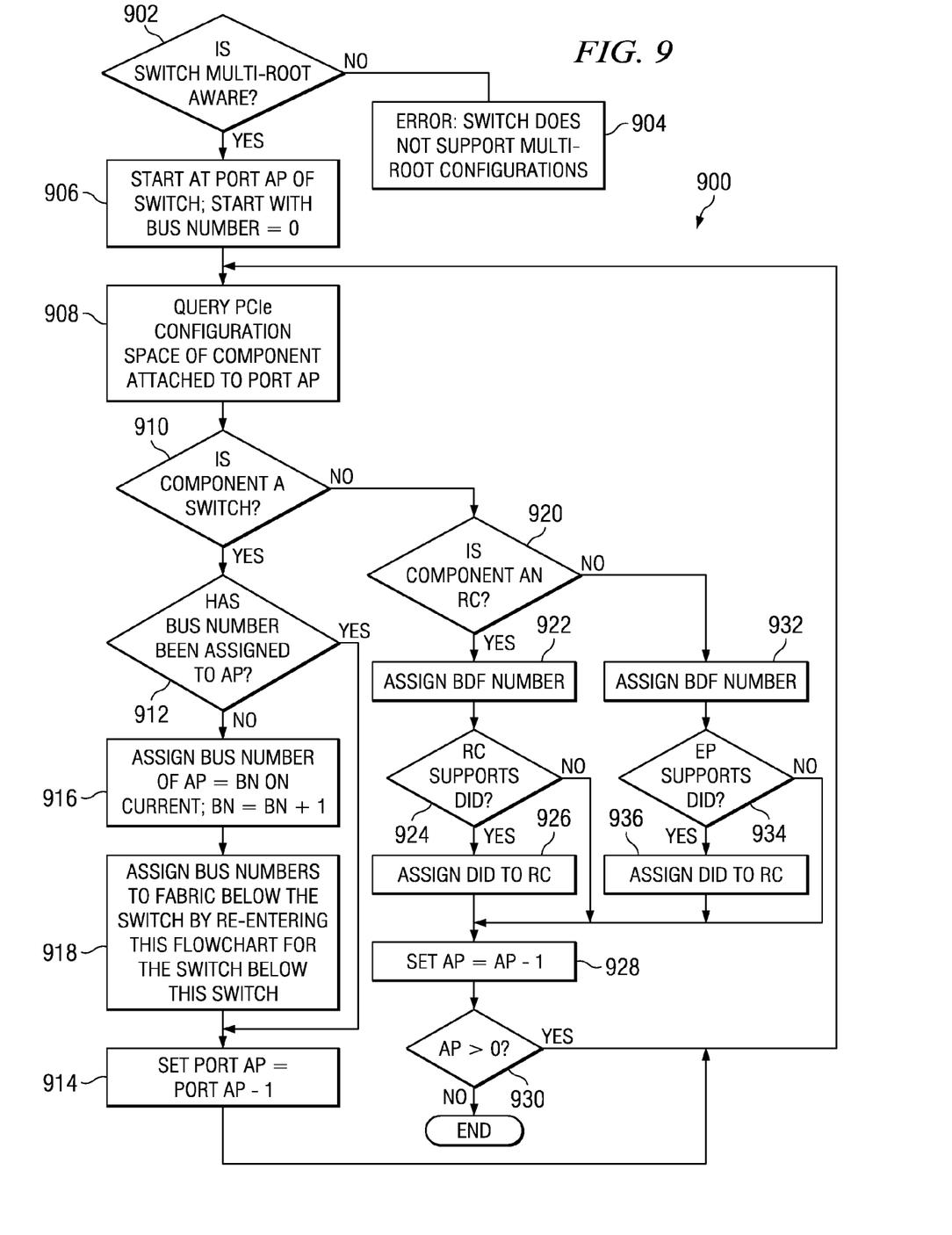
FIG. 9 is a flowchart that illustrates a method for assigning source and destination identifiers in connection with managing the routing of data in a distributed computing system according to an exemplary embodiment of the present invention.

FIG. 9 is a flowchart that illustrates a method for assigning source and destination identifiers in connection with managing the routing of data in a distributed computing system according to an exemplary embodiment of the present invention. The method is generally designated by reference number 900 and may be implemented as Step 806 in FIG. 8.

Referring to FIG. 9, a determination is first made whether the switch is multi-root aware (Step 902). If the switch is not multi-root aware (No output of Step 902), the method finishes with an error (Step 904) because the switch will not support multi-root configurations.

If the switch is multi-root aware (Yes output of Step 902), the PCM begins at Port AP (AP=Active Port) of the switch, and starts with Bus#=0 (Step 906). The PCM then queries the PCIe Configuration Space of the component attached to port AP (Step 908). A determination is made whether the component is a switch (Step 910). If the component is a switch (Yes output of Step 910), a determination is made whether a Bus# has been assigned to port AP (Step 912). If a Bus# has been assigned to port AP (Yes output of Step 912), port AP is set equal to port AP−1 (Step 914), and the method returns to Step 908 to repeat the method with the next port.

If a Bus# has not been assigned to port AP (No output of Step 912), a Bus # of AP=BN is assigned on current; BN=BN+1 (Step 916), and Bus#s are assigned to the I/O fabric below the switch by re-entering this method for the switch below the switch (Step 918). Port AP is then set equal to port AP−1 (Step 914), and the method returns to Step 908 to repeat the method with the next port.

If the component is determined not to be a switch (No output to Step 910), a determination is made whether the component is an RC (Step 920). If the component is an RC (Yes output of Step 920), a BDF# is assigned (Step 922) and a determination is made whether the RC supports the DID (Step 924). If the RC does support the DID (Yes output of Step 924), the DID is assigned to the RC (Step 926). The AP is then set to be equal to AP−1 (Step 928), and a determination is made whether the AP is greater than 0 (Step 930). If the AP is not greater than 0 (No output of Step 930), the method ends. If the AP is greater than 0 (Yes output of Step 930), the method returns to Step 908 to query the PCIe configuration Space of the component attached to the next port.

If the RC does not support DID (No output of Step 924), the AP is set=AP−1 (Step 928), and the process continues as described above.

Meanwhile, if the component is determined not to be an RC (No output of Step 920), A BDF# is assigned (Step 932), and a determination is made whether the EP supports DID (Step 934). If the EP supports DID (Yes output of Step 934), the DID is assigned to EP (Step 936). The AP is set=AP−1 (Step 928), and the process continues from there as described above.

If the EP does not support DID (No output of Step 934), the AP is set=AP−1 (Step 928), and the process continues as described above.

Returning back to FIG. 8, after a DID and BDF# has been assigned to all RCs and EPs in the DIDRT, and Bus#s are assigned to all switch to switch links (Step 806), the RCN is set to the number of RCs in the fabric (Step 808), and a virtual tree is created for the RCN by copying the full physical tree (Step 810). The virtual tree is then presented to the administrator or agent for the RC (Step 812). The system administrator or agent deletes EPs from the tree (Step 814), and a similar process is repeated until the virtual tree has been fully modified as desired.

A DIDVT is then created on each switch showing the RC DID# associated with the list of EP BDFs, and EP DID# associated with the list of EP BDF#s (Step 816). The RCN is then made equal to RCN−1 (Step 818), and a determination is made whether RCN=0 (Step 820). If the RCN=0 (Yes output of Step 820), the method ends. If RCN does not equal 0 (No output of Step 820), the method returns to Step 810, and a virtual tree is created by copying the next physical tree and repeating the subsequent steps for the next virtual tree.

The present invention thus provides a method and system for managing the routing of data in a distributed computing system, such as a distributed computing system that uses PCI Express protocol to communicate over an I/O fabric. A physical tree that is indicative of a physical configuration of the distributed computing system is determined, and a virtual tree is created from the physical tree. The virtual tree is then modified to change an association between at least one source device and at least one target device in the virtual tree. A validation mechanism validates the changed association between the at least one source device and the at least one target device to enable routing of data from the at least one source device to the at least one target device.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A managing system for managing routing of data in a distributed computing system, comprising:
   a mechanism for determining a physical tree indicative of a physical configuration of the distributed computing system;
   a mechanism for creating a virtual tree from the physical tree by copying the physical tree, wherein a configuration of the virtual tree is a same configuration as the physical configuration;
   a modification enabling mechanism for enabling modification of the virtual tree to change an association between at least one source device and at least one target device in the virtual tree to form a modified virtual tree; and
   a validating mechanism for validating the changed association between the at least one source device and the at least one target device in the modified virtual tree to enable routing of data from the at least one source device to the at least one target device, wherein the changed association in the modified virtual tree must be validated to allow access between the at least one source device and the at least one target device.

2. The system according to claim 1, wherein the mechanism for determining a physical tree indicative of a physical configuration of the distributed computing system, comprises a destination identification routing table in at least one of a bridge and switch in the physical tree for indicating at least one port in the at least one of a bridge and switch that is associated with the at least one target device through which data is to be routed.

3. The system according to claim 1, wherein the mechanism for creating a virtual tree from the physical tree comprises a mechanism for creating a virtual tree for a source device of the at least one source device.

4. The system according to claim 2, wherein the validating mechanism comprises a validation table in the at least one of a bridge and switch that associates one or more source devices with each of a plurality of target devices to enable routing of data from the at least one source device to the at least one target device through the at least one of a bridge and switch, wherein the one or more source devices are authorized to access a specific target device in the plurality of target devices.

5. The system according to claim 1, wherein the at least one source device comprises one of a root complex and an Input/Output Adapter, and wherein the at least one target device comprises the other one of the root complex and the Input/Output Adapter.

6. The system according to claim 1, wherein the mechanism for enabling modification of the virtual tree to change an association between at least one source device and at least one target device in the virtual tree, comprises a mechanism for enabling transfer of at least one target device to a different source device, and a mechanism for enabling, adding, or deleting of at least one source device and/or at least one target device from the virtual tree.

7. The system according to claim 1, wherein the distributed computing system comprises a distributed computing system that uses PCI Express protocol.

8. A computer program product for managing routing of data in a distributed computing system, the computer program product comprising:
   a computer usable storage medium having encoded therein computer usable program code executed on a computer;
   computer usable program code configured to determine a physical tree indicative of a physical configuration of the distributed computing system;
   computer usable program code configured to create a virtual tree from the physical tree by copying the physical tree, wherein a configuration of the virtual tree is a same configuration as the physical configuration;
   computer usable program code configured to enable modification of the virtual tree to change an association between at least one source device and at least one target device in the virtual tree to form a modified virtual tree; and
   computer usable program code configured to validate the changed association between the at least one source device and the at least one target device in the modified virtual tree to enable routing of data from the at least one source device to the at least one target device, wherein the changed association in the modified virtual tree must be validated to allow access between the at least one source device and the at least one target device.

9. The computer program product according to claim 8, wherein the computer usable program code configured to create a virtual tree from the physical tree comprises:
   computer usable program code configured to create a virtual tree for a source device of the at least one source device.

10. The computer program product according to claim 9, wherein the computer usable program code configured to enable modification of the virtual tree to change an association between at least one source device and at least one target device in the virtual tree, comprises:
    computer usable program code configured to present the virtual tree to a representative of the source device of the at least one source device, wherein the representative modifies the virtual tree to change an association between the at least one source device and the at least one target device in the virtual tree.

11. The computer program product according to claim 8, wherein the computer usable program code configured to enable modification of the virtual tree to change an association between at least one source device and at least one target device in the virtual tree, comprises:
    computer usable program code configured to enable transfer of at least one target device to a different source device; and
    computer usable program code configured to enable, add, or delete at least one source device and/or at least one target device from the virtual tree.

* * * * *